US009922486B2

(12) United States Patent
Truong et al.

(10) Patent No.: US 9,922,486 B2
(45) Date of Patent: Mar. 20, 2018

(54) UNIQUE IDENTIFICATION OF COIN OR OTHER OBJECT

(71) Applicants: ROYAL CANADIAN MINT, Ottawa (CA); SIGNOPTIC TECHNOLOGIES, Le Bourget du Lac (FR)

(72) Inventors: Hieu Truong, Orleans (CA); Yann Boutant, Chindrieux (FR)

(73) Assignees: Arjo Solutions, Levellois-Perrett (FR); Royal Canadian Mint, Ottawa, Ontario (CA)

( * ) Notice: Subject to any disclaimer, the term of this patent is extended or adjusted under 35 U.S.C. 154(b) by 0 days.

(21) Appl. No.: 14/762,978

(22) PCT Filed: Apr. 30, 2013

(86) PCT No.: PCT/CA2013/050333
§ 371 (c)(1),
(2) Date: Jul. 23, 2015

(87) PCT Pub. No.: WO2014/113865
PCT Pub. Date: Jul. 31, 2014

(65) Prior Publication Data

US 2015/0363990 A1 Dec. 17, 2015

Related U.S. Application Data

(60) Provisional application No. 61/756,301, filed on Jan. 24, 2013.

(51) Int. Cl.
*G06K 9/00* (2006.01)
*G07D 5/00* (2006.01)
(Continued)

(52) U.S. Cl.
CPC ............. *G07D 5/005* (2013.01); *A44C 21/00* (2013.01); *G06K 9/4604* (2013.01); *G07D 7/003* (2017.05); *G07D 7/20* (2013.01); *B42D 2035/34* (2013.01)

(58) Field of Classification Search
None
See application file for complete search history.

(56) References Cited

U.S. PATENT DOCUMENTS 4,899,392 A 2/1990 Merton
5,046,841 A 9/1991 Juds
(Continued)

FOREIGN PATENT DOCUMENTS

CA 2033962 8/1991
CN 1499435 5/2004
(Continued)

OTHER PUBLICATIONS http://www.pcgscoinfacts.com/Coin/Detail/8057 (screenshot from Jun. 6, 2017).*
(Continued)

*Primary Examiner* — Sean Conner
(74) *Attorney, Agent, or Firm* — Andrus Intellectual Property Law, LLP

(57) ABSTRACT

A method of producing an authenticatable article. An overt feature is produced in the article using a fabricating technique which is selected based on a material of the article so as to produce the overt feature having predetermined, reproducible macroscopic characteristics as well as random, non-reproducible microscopic characteristics rendering the article physically unique. The overt feature including the microscopic characteristics are imageable using a predetermined imaging technology to produce an overt feature image. An authentication signature is generated based on the
(Continued)

overt feature image and stored in a central database. The overt feature may alternatively be produced in an apparatus or means used to manufacture authenticatable articles such that the overt feature including the random, microscopic characteristics is reproduced in the articles. The overt feature and generated authentication code therefore corresponds to articles manufactured using that apparatus or means.

18 Claims, 5 Drawing Sheets

(51) Int. Cl.

| | |
|---|---|
| ***A44C 21/00*** | (2006.01) |
| ***G06K 9/46*** | (2006.01) |
| ***G07D 7/20*** | (2016.01) |
| ***G07D 7/00*** | (2016.01) |

(56) References Cited

U.S. PATENT DOCUMENTS

| | | | | |
|---|---|---|---|---|
| 5,133,019 | A | 7/1992 | Merton et al. | |
| 5,144,495 | A | 9/1992 | Merton et al. | |
| 5,216,234 | A | 6/1993 | Bell | |
| 5,220,614 | A | 6/1993 | Crain | |
| 5,521,984 | A * | 5/1996 | Denenberg | G06K 9/00134 382/100 |
| 6,305,523 | B1 | 10/2001 | House et al. | |
| 6,325,197 | B1 | 12/2001 | Furuya | |
| 6,685,000 | B2 | 2/2004 | Sugata et al. | |
| 6,823,315 | B1 | 11/2004 | Bucci et al. | |
| 6,871,788 | B2 | 3/2005 | Tompkin et al. | |
| 7,469,828 | B2 | 12/2008 | Baker et al. | |
| 7,871,000 | B2 | 1/2011 | Baker et al. | |
| 7,916,281 | B2 | 3/2011 | Haddock | |
| 8,090,952 | B2 | 1/2012 | Harris | |
| 2002/0005329 | A1 | 1/2002 | Sugata et al. | |
| 2004/0022444 | A1 | 2/2004 | Rhoads | |
| 2005/0067497 | A1 * | 3/2005 | Jones | G06K 19/02 235/492 |
| 2008/0230402 | A1 | 9/2008 | Macor | |
| 2009/0080760 | A1 * | 3/2009 | Knysh | G06K 9/00577 382/141 |
| 2009/0083151 | A1 | 3/2009 | Urban | |
| 2009/0110295 | A1 | 4/2009 | Ogaki et al. | |
| 2009/0257619 | A1 | 10/2009 | Boutant et al. | |
| 2010/0297027 | A1 | 11/2010 | Loiret-Bernal et al. | |
| 2011/0095082 | A1 | 4/2011 | Baker et al. | |
| 2011/0126618 | A1 * | 6/2011 | Blake | G07D 5/005 73/163 |
| 2011/0191590 | A1 | 8/2011 | Darbellay et al. | |
| 2012/0273564 | A1 | 11/2012 | Mercolino et al. | |
| 2015/0131890 | A1 | 5/2015 | Rourk | |

FOREIGN PATENT DOCUMENTS

| | | | |
|---|---|---|---|
| CN | 102598027 | A | 7/2012 |
| CN | 103635941 | A | 3/2014 |
| EP | 0439669 | | 8/1991 |
| JP | 2003-187289 | | 7/2003 |
| JP | 2003-196657 | | 7/2003 |
| JP | 2003281593 | | 10/2003 |
| JP | 2004078478 | | 3/2004 |
| JP | 2005010581 | A | 1/2005 |
| JP | 2006-301881 | | 11/2006 |
| JP | 2007534067 | A | 11/2007 |
| JP | 2009109419 | A | 5/2009 |
| JP | 20100092435 | | 4/2010 |
| JP | 2010529798 | A | 8/2010 |
| JP | 2012083964 | | 4/2012 |
| JP | 2012121173 | A | 6/2012 |
| WO | 9429817 | | 12/1994 |
| WO | 2008152393 | A2 | 12/2008 |
| WO | 2010121362 | A1 | 10/2010 |
| WO | 2011110973 | | 9/2011 |
| WO | 2012145842 | | 11/2012 |

OTHER PUBLICATIONS

Examination Report for AU2012248087 dated Jul. 25, 2015.
Office Action for CN2012800323346 dated Aug. 23, 2015.
Search Report for EP12777030 dated Dec. 11, 2014.
International Search Report and Written Opinion for PCT/CA2012/050255 dated Jul. 10, 2012.
International Preliminary Report on Patentability for PCT/CA2012/050255 dated Aug. 20, 2013.
International Preliminary Report on Patentability for PCT/CA2013/050333 dated Aug. 6, 2015.
Office Action and Search Report for Taiwanese Patent Application No. 101114537 dated Jan. 18, 2016.
Office Action for U.S. Appl. No. 14/114,683 dated Dec. 28, 2015.
Office Action and Search Report for Japanese Patent Application No. P2014-506702.
Office Action for U.S. Appl. No. 14/114,683 dated Feb. 11, 2016.
Office Action for Chinese Patent Application No. 2012800323346 dated Apr. 26, 2016, and translation.
Singapore Written Opinion for Patent Application No. 11201505783X dated Mar. 21, 2016.
International Search Report for PCT/CA2013/050333 dated Aug. 9, 2013.
Final Office Action dated Jul. 8, 2016 for U.S. Appl. No. 14/114,683, filed Mar. 4, 2014, 32 pages.
Supplementary European Search Report for Application No. EP13872453, dated Sep. 28, 2016, 9 pages.
Office Action dated Nov. 28, 2016 issued on the Corresponding Japanese Application No. JP20150553991.
Australian Patent Application No. 20130375797, Examination Report dated May 1, 2017.
Japanese Patent Application No. 20150553991, Rejection Notice dated Apr. 10, 2017.
English Translation of Second Office Action dated Nov. 28, 2016 issued on the Corresponding Japanese Application No. JP20150553991.
Arab (GCC) Patent Application No. GC2012-21124, Examination Report dated Nov. 16, 2016.
International PCT Application No. PCT/CA2013/050333, Written Opinion dated Sep. 23, 2013, 7 pages.
Chinese Patent Application No. 201380074808.8, Office Action dated Oct. 9, 2017—English Translation available.
Japanese Patent Application No. 2015-553991 Office Action (Pre-Appeal Report) dated Oct. 3, 2017 and English translation.

* cited by examiner

UNIQUE IDENTIFICATION OF COIN OR OTHER OBJECT

CROSS REFERENCE TO RELATED APPLICATION

The present application is the U.S. national stage of International Application PCT/CA2013/050333, filed Apr. 30, 2013, which international application was published on Jul. 31, 2014, as International Publication No. WO2014/113865. The International Application claims priority to U.S. Provisional Patent Application No. 61/756,301, filed Jan. 24, 2013, the contents of which are incorporated herein by reference in their entireties.

FIELD OF THE INVENTION

The present invention relates generally to object authentication and more particularly to object authentication based on physical characteristics.

BACKGROUND OF THE INVENTION

It is well known that articles of trade and commerce whose value depends upon authenticity are subject to counterfeit. Such articles include currency such as coins and banknotes, and investment commodities such as bullion coins and bars, but may also include luxury items such as designer apparel and accessories. In some cases, such as banknotes, substantially all of the value of the article may derive from its authenticity, that is the confidence that it is what it appears to be which may concern its materials, utility, or its source or conditions of manufacture.

Many methods and techniques have been developed to enable authentication of valuable articles and are generally directed to enabling a person to distinguish between authentic articles and counterfeit articles. In some cases, authentication undesirably requires alteration to the article being authenticated. For example, gold coins and gold wafers are an investment means which people buy either to invest or to save. Gold can be determined as real gold through traditional methods such as chemical assays, instrumental analysis assays, fire assays, stone assays, and so forth. All of these methods are destructive, however, and require equipment, expertise, know-how, experience, and time. In addition, the authentication services may not be easily accessible to the public where and when needed.

Alternatively, some methods do not require alteration of the article, but instead rely upon preexisting physicochemical characteristics of the article which may be measured and used to generate an identifier associated with the article and which is subsequently used in its remote authentication. For example, World Intellectual Property Organization International Publication Number WO 2012/145842 by the present inventors, and which is incorporated herein in its entirety, discloses a method wherein an image of an article, specifically a coin, is captured and a digital representation of an acquisition area of the coin including a feature is generated. The feature may include a first component common to more than one coin and a second component unique to the coin. The feature may be random, such as naturally occurring features resulting from handling or processing during manufacture, or may be deterministic such as an intentionally applied feature produced by known fabrication techniques. An identifier is generated based on the digital representation of the feature and is later used to authenticate the coin.

The above method suffers the disadvantage, however, that for certain materials such as dense metals like gold, the random, naturally occurring features are relatively fine-grained and not distinguishable at low magnification, e.g. about 20 times. Producing digital representations of such naturally occurring features in such a case which are sufficiently reliable for the purposes of authentication thus requires relatively expensive equipment which is not typically available to a wide variety of users. Accordingly, the method may not permit convenient implementation for such materials using inexpensive, ubiquitous equipment available to a wide variety of users.

While the above solutions enable a high level of security including authentication, further improvements are possible and desirable. In particular, it is desirable to provide a method which renders as difficult as possible any forgery or false authentication by a counterfeiter, but at the same time enables quick and reliable authentication without need for special expertise or equipment.

SUMMARY OF THE INVENTION

The above advantages may be provided by systems and methods wherein a valuable article is physically transformed using a technology which results intentionally in an overt, visible feature with at least some macroscopic characteristics which are predetermined, such as its shape and size, but also with at least some characteristics which are random or probabilistic in nature thereby rendering the feature non-reproducible by the technology employed. This overt feature may be produced using any convenient fabricating technique according to the article material involved. The fabricating technique may be selected based on the material so as to generate the random or probabilistic characteristics having a predetermined resolution, coarseness, surface roughness, or such other property as enables reliable imaging using simple, inexpensive, and commonly available imaging technology. For example, and without limiting the generality of the invention, the fabricating technique may be selected such that the random or probabilistic characteristics are capable of reliable digital imaging at a magnification of about 20 times. For example, where the article is a coin, useful fabricating techniques include laser engraving, acid etching, photosensitive etching, random dot machine engraving, sandblasting, and so forth. Such techniques are useful to transform a natural topography of the article material into an irreversible, permanent, and impossible to replicate physical feature having a visibly changed appearance of the material, while at the macroscopic level rendering a reproducible physical form.

This material transformation resulting from the fabrication of the feature may be considered to be an overt security feature and enables authentication of the article by virtue of the fact that it cannot be exactly reproduced thereby rendering the article physically unique. In addition, other aspects of the article may be used along with the measured random feature in order to generate an authentication signature useful to authenticate the article. The selection of such other aspects may not be apparent from the article itself and may thus be considered a covert security feature as it will not generally be possible for a prospective counterfeiter to deduce how to forge the authentication signature based only on an analysis of an authentic article.

The valuable article according to the invention physically transformed comprises, by means of the overt visible feature, a “first level” security feature which can allow authenticating of the article with naked eye. For instance, the “first level" security feature may comprise a code, a symbol, a graphic or alpha-numeric character. However, it can also comprise "second level" and/or "third level" security feature.

Advantageously, the valuable article according to the present invention may comprise a "second level" security feature, preferably integrated in, part of or combined with the overt visible feature. For instance, this "second level" security feature may comprise a code, a symbol, a graphic or alpha-numeric character, such as year of production, visible by means of a simple device such as a magnifying glass.

In another aspect of the invention, the "second level" security feature is an identification code which can be associated with production and/or logistic data in order to carry out the tracking and tracing and/or quality control of individual or family valuable article. Alternatively, this identification code can be either an access key to a database in which production and/or logistic data are recorded, or a public key for cryptography algorithm such as "Rivest Shamir Adleman" algorithm (RSA) or any other asymmetric encryption algorithm.

Additionally, the valuable article according to the invention physically transformed comprises, by means of the non-reproducible random feature intentionally produced, a "third level" security feature which can allow the generation of an authentication signature.

Thus, an authentication signature may be generated based on a measurement or digitized image of the non-reproducible random feature intentionally produced in the article as well as other aspects of the article whose selection is not determinable from the article itself. The authentication signature may then be stored in a central database. Later authentication of the article then proceeds by again measuring or imaging the random feature and reproducing the method of generating the authentication signature, which may be performed at least in part at a location remote to the article such as a central server. If the original and later authentication signatures agree within predefined tolerances then the article is identified as authentic, and if not it is identified as inauthentic or suspect.

Alternatively, the random feature may be applied to whatever apparatus or other means is used to fabricate the article in the first place which then results in a reproduction of the feature or a version thereof on the article itself. For example, where the article is a coin, the random feature may be applied to the die, punch, or matrix used to make the coin, in which case all coins produced using that die, punch, or matrix will bear the feature. In such case, measuring and recording the feature and generation of a signature therefrom serves to identify and authenticate all of the articles produced using that means, such as all of the coins produced using a particular die, etc.

In case random feature is applied to the die, punch, or matrix to make the coin, an additional step of sampling several reference authentication signatures generated from random feature during production process allow subsequent control and/or adaptation of the signature generation thereby improving authenticating process. Indeed, due the wear of the die the authentication signature may vary during production time. Therefore, for example, authentication signatures in the beginning, middle, end of the production process can be set as reference signatures in order to take into account the wear effect of the die in the authentication signatures generation, thereby improving it. Such reference signatures are used to define the time position of a particular coin in the production process, beginning, middle or end of the process. Time position is preferably recorded in database in correspondence with corresponding authentication signature. This information can there be retrieved during authenticating subsequent step. Moreover, a control of the reference signature, or a comparison between subsequent reference signatures, allow to detect a unexpected trouble in the production process or a die which wear is no more acceptable therefore the next correcting step is for instance the cleaning of the die or its replacement.

In either case, the article may be traced to the original location of manufacturing and thus authentication may be performed via any means capable of generating the requisite measurement or image of the feature anywhere in the world.

Thus, in a first embodiment, a method of producing an authenticatable article has the following steps. An overt feature is produced in the article using a fabricating technique, the fabricating technique being selected based on a material of the article so as to produce the overt feature having predetermined, reproducible macroscopic characteristics as well as random, non-reproducible microscopic characteristics, wherein the microscopic characteristics are imageable using a predetermined imaging technology. The overt feature is imaged using the predetermined imaging technology to produce an overt feature image. An authentication signature is generated based on the overt feature image. The authentication signature is stored in a central database.

The predetermined, reproducible macroscopic characteristics of the overt feature may comprise a size or a shape of the overt feature. The shape of the overt feature may comprise a code, a symbol, a graphic, or an alpha-numeric character, wherein the size of the overt feature renders the shape discernible to a naked eye, or wherein the size of the overt feature renders the shape discernible only under magnification. The shape may comprise an identification code associated with production or logistic data for performing tracking, tracing, or quality control of the article. The identification code may comprise an access key to a database storing the production or logistic data, or a public key for use with a cryptographic algorithm.

The random, non-reproducible microscopic characteristics of the overt feature may comprise a predetermined resolution, coarseness, surface roughness, or other property enabling reproducible imaging of the random, non-reproducible microscopic characteristics using the predetermined imaging technology. The non-reproducible microscopic characteristics may be reproducibly imageable using the predetermined imaging technology under about 20× magnification.

The method may further include measuring or imaging a covert feature of the article, the covert feature comprising a different aspect of the article non-deducible from an inspection of the article, wherein the authentication signature is further generated based on a measurement or image of the covert feature.

The article may be a coin, wherein the material of the coin is a metal or metal alloy, and wherein the fabricating technique comprises laser engraving, acid etching, photosensitive etching, random dot machine engraving, or sandblasting. The article may be a bullion coin, wherein the material of the article is gold or platinum, and wherein the fabricating technique comprises laser engraving.

The fabricating technique may be incapable of exactly reproducing the non-reproducible microscopic characteristics, whereby the non-reproducible microscopic characteristics render the article physically unique.

In a second embodiment, a method of authenticating an authenticatable article comprises the following steps. An overt feature has predetermined, reproducible macroscopic characteristics as well as random, non-reproducible microscopic characteristics, the random, non-reproducible microscopic characteristics rendering the article physically unique. The overt feature is imaged using a predetermined imaging technology to produce an overt feature image. An authentication signature is generated based on the overt feature image. The authentication signature is sent to a predetermined central server. An indication is received from the predetermined central server that the authentication signature matches a stored authentication signature within predefined tolerances. The overt feature may be imaged at a location remote to the central server.

In a third embodiment, a method of producing authenticatable articles has the following steps. An overt feature is produced in an apparatus or means used to manufacture the articles using a fabricating technique selected based on a material of the apparatus or means so as to produce the overt feature having predetermined, reproducible macroscopic characteristics as well as random, non-reproducible microscopic characteristics. The overt feature is reproduced in the articles when the articles are manufactured using the apparatus or means, wherein the microscopic characteristics are imageable from the articles using a predetermined imaging technology. The overt feature is imaged using the predetermined imaging technology from at least one of the articles to produce an overt feature image. An authentication signature is generated based on the overt feature image. The authentication signature is stored in a central database.

The articles may be coins, wherein the apparatus or means comprises a die, a punch, or a matrix. The material of the die, the punch, or the matrix may be a metal or metal alloy, wherein the fabricating technique may comprise laser engraving, acid etching, photosensitive etching, random dot machine engraving, or sandblasting.

The predetermined, reproducible macroscopic characteristics of the overt feature may comprise a size or a shape of the overt feature. The shape of the overt feature may comprise a code, a symbol, a graphic, or an alpha-numeric character, wherein the size of the overt feature is such that the shape is discernible to a naked eye, or wherein the size of the overt feature is such that the shape is discernible under magnification. The shape may comprise an identification code associated with production or logistic data for performing tracking, tracing, or quality control of the articles. The identification code may comprise an access key to a database storing the production or logistic data, or a public key for use with a cryptographic algorithm.

The random, non-reproducible microscopic characteristics of the overt feature may comprise a predetermined resolution, coarseness, surface roughness, or other property enabling reproducible imaging of the random, non-reproducible microscopic characteristics using the predetermined imaging technology. The non-reproducible microscopic characteristics may be reproducibly imageable using the predetermined imaging technology under about 20× magnification.

The method may further comprise measuring or imaging a covert feature of the at least one article, the covert feature comprising a different aspect of the article non-deducible from an inspection of the article, and wherein the authentication signature is further generated based on a measurement or image of the covert feature.

The fabricating technique may be incapable of exactly reproducing the non-reproducible microscopic characteristics, whereby the non-reproducible microscopic characteristics render the apparatus or means physically unique.

In a further embodiment based on the third embodiment, the at least one article is a first one of the articles manufactured using the apparatus or means at a first time during a production process, and a second one of the articles is manufactured using the apparatus or means at a second time during the production process, the second time being different from the first time. The overt feature is characterized by a first condition of wear at the first time, and the overt feature is characterized by a second condition of wear at the second time, the second condition of wear being different from the first condition of wear. The microscopic characteristics imageable from the first article are characterized by the first condition of wear, and the microscopic characteristics imageable from the second article are characterized by the second condition of wear. The overt feature image produced by imaging the overt feature from the first article is a first overt feature image characterized by the first condition of wear, and the authentication signature is a first authentication signature characterized by the first condition of wear. The method further comprises the following steps. The overt feature is imaged using the predetermined imaging technology from the second article to produce a second overt feature image characterized by the second condition of wear. A second authentication signature is generated based on the second overt feature image and characterized by the second condition of wear. The second authentication signature is stored in the central database.

The method may further comprise storing the first authentication signature in the central database in association with the first time, and storing the second authentication signature in the central database in association with the second time.

The method may further comprise determining based on the second overt feature image that the second condition of wear exceeds an predefined acceptable level of wear.

In a fourth embodiment, a method of authenticating articles includes the following steps. An overt feature is produced using a fabricating technique in an apparatus or means used to manufacture the articles. The fabricating technique is selected based on a material of the apparatus or means so as to produce the overt feature having predetermined, reproducible macroscopic characteristics as well as random, non-reproducible microscopic characteristics. The overt feature is reproduced in the articles when the articles are manufactured using the apparatus or means, wherein the microscopic characteristics are imageable from the articles using a predetermined imaging technology. Using the predetermined imaging technology, the overt feature is imaged from selected ones of the articles manufactured at predetermined different times during a production process of the articles to produce corresponding overt feature images. At least one authentication signature is generated based on the overt feature images. The least one authentication signature is stored in a central database.

A different authentication signature may be generated based on each one of the overt feature images, wherein each of the different authentication signatures is stored in the central database in association with the corresponding predetermined different time.

The at least one authentication signature may comprise a single authentication signature recalculated as a moving average at each predetermined different time based on an original authentication signature generated at a first one of the predetermined different times and further authentication signatures generated at further ones of the predetermined different times.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
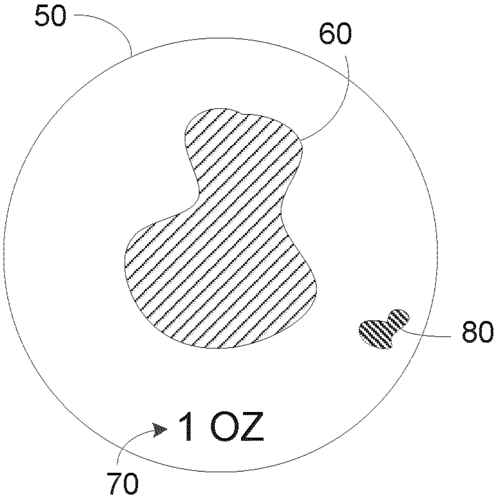
FIG. 1 is a schematic image of an authenticatable article, specifically a coin, bearing an overt security feature.

The methods and systems described herein are useful for authenticating valuable articles which may include any physical object capable of reproducible fabrication including the production of a particular feature by predetermined means which is characterized both by determinable physical properties and random or probabilistic physical properties. In particular, the article may be a coin or banknote, an investment commodity such as a bullion coin or bar, or may be a luxury item such as an article of designer apparel or accessory. Coins may include coins, wafers, bars, bullion, medallions, medals, security tokens, ornaments, circulation coins, numismatic coins, investment coins. Coins may be made of base metals, precious metals, or both. The exemplary embodiments described below are based on the selection of the article as being a coin, which may be currency or bullion, but it will be understood that such selection is required by convenience of exposition only and does not limit the scope or intent of the solution.

The physical properties of the applied feature may include any properties which are measurable. Embodiments below assume that the determinable properties include macroscopic size, shape, and configuration of the feature, while the random or probabilistic physical properties include a surface topology of the feature. Again, such selections are required by convenience and do not limit the solution. In any event, the randomness or probabilistic nature of the feature results not from a selective control of the fabrication technology with this purpose, but rather results from the nature of the fabrication technology itself which uncontrollably produces the random or probabilistic topology.

This overt feature may be produced using any convenient fabricating technique according to the article material involved.

There are many known methods for producing features on coins, for example, wherein the characteristics of the feature are generally controllable. Thus, the physical transformation involved and the resulting feature can be orderly rather than random or probabilistic, and may include, for example, an engraved design, a print made by known methods (pad printing, gravure printing, inkjet printing, lithography printing, silk printing, intaglio printing), an affixed or stamped hologram, 2D matrix code, bar code, QR code, and so forth. Such methods and the resulting features, however, may remain precisely reproducible by counterfeiters, and thus provide a lesser degree of security than methods and features which in their nature involve some random or probabilistic aspect such that the resulting feature is not precisely reproducible. A counterfeiter in such circumstances need not deduce the method of authentication ultimately employed as it would be possible to make an exact duplicate of the authentic article. Consequently, any signature or authentication code generated therefrom would be identical whether the article were authentic or a forgery. While the techniques described herein may include production of a feature by such methods, enhanced security may be achieved by employing a method involving a random or probabilistic aspect.

Thus, where the article is a coin, useful fabricating techniques including an uncontrolled random or probabilistic aspect suitable to produce a non-reproducible feature may include laser engraving, acid etching, photosensitive etching, random dot machine engraving, sandblasting, and so forth. Such techniques are useful to transform a natural topography of the article material into an irreversible and permanent physical feature which is impossible precisely to replicate and has a visibly changed appearance of the material, while at the macroscopic level rendering a reproducible physical form. The fabricating technique may be selected based on the article material so as to produce the random or probabilistic aspect or characteristic having a predetermined coarseness such that it is capable of reliable digital imaging using simple, commonly-available imaging technology. As noted above, in one embodiment the desired degree of coarseness or surface roughness may be expressed as that which makes possible reliable digital imaging at a magnification of about 20 times.

Reference is made to FIG. 1 which shows an exemplary authenticatable article, namely a coin 50. The coin 50 may have reproducible design elements 60 as are typically provided along with identifying marks 70 which may be a denomination or any other such matter useful to identify a relevant characteristic of the coin or its use. In the example, the identifying mark 70 is shown as a weight which is typically provided in the case where the exemplary coin is bullion. The design elements 60 and identifying mark 70 are typically produced identically on each member of a number of articles produced using the same means, such as a tool, die, mold, or so forth. The coin 50 also has an overt security feature 80 produced as described herein. The feature 80 may be a design element and detectable by normal human vision without visual aids. For example, the feature may be a well-recognized icon such as a maple leaf, and may be immediately recognized as such by a person observing the coin. By virtue of the manner of its fabrication, however, the feature is characterized by properties which are random or probabilistic and thus the feature is not precisely reproducible.

For example, where the article is a coin and the feature is produced using the fabrication technology of laser engraving, the feature will appear frosted to the naked eye which at the microscopic scale results from a random or probabilistic distribution of raised points and various shapes of different sizes, reflectivities, and surface roughness. In general, the frosting effect cannot be exactly replicated with the exact details and this gives the feature its uniqueness. Different fabrication technologies may produce different physical transformations which may be measured or imaged and used to generate a signature. For example, sandblasting creates on a metal surface a random distribution of grain structure. Other technologies may be used which similarly produce random or probabilistic, or generally uncontrollable, physical transformations or patterns which may be used to generate a signature.

Figure 2:
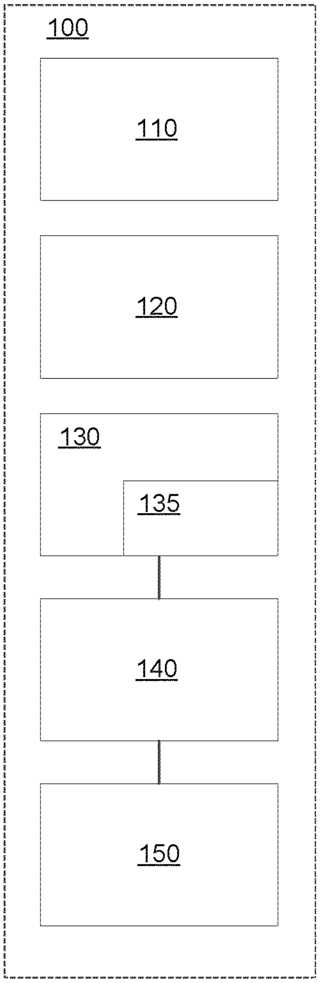
FIG. 2 is a schematic illustration of a system for producing an authenticatable article.

Reference is made to FIG. 2 which shows a system 100 for producing the high security article capable of reliable authentication as described herein. The system 100 may include an article fabrication means 110, a feature application means 120, and a feature reading means 130. The article fabrication means 110 is useful to produce the article in all its aspects absent the overt security feature. The feature application means 120 is useful to produce on the article so manufactured the feature including the determinable properties such as size and shape, as well as the random or probabilistic properties such as the surface topography. The feature reading means 130 is useful to read or measure the random or probabilistic properties of the overt feature. In some embodiments, the system 100 may omit the article fabrication means 110 when the article is provided already fabricated and ready to have the feature applied thereon by the feature application means 120.

The feature application means 120 may include any components or aspects as are necessary or desirable according to the technology employed to produce the feature in the article, and may encompass known aspects of any of the fabrication technologies described herein or functional alternatives. For example, and without limiting the generality of the solution desired herein, the overt security feature may be a maple leaf produced by laser engraving and have micro-engraved therein another symbol such as the numeral "13". The maple leaf may be conspicuous and easily recognizable by the unaided eye, while the numeral "13" may require a loupe to recognize. The maple leaf may have a roughened texture resulting from its means of fabrication.

Similarly, the feature reading means 130 may include any components or aspects as are necessary or desirable according to the technology employed to produce the feature in order to read, measure, image, or otherwise determine the random or probabilistic properties of the feature so created, and for example may include any sensors suitable to measure or determine the properties. The feature reading means 130 may include or cooperate with other aspects to facilitate measurement or imaging of the feature, and may include in some embodiments a holder which may incorporate a source of controlled illumination, a special lens and a locator which permits the coin or other article to be positioned in a predetermined position, within predetermined tolerances. The feature reading means 130 may further include or cooperate with imaging sensors, such as a camera, which may constitute an imaging system 135.

The system 100 may include processing means 140 connected to or otherwise cooperating with the feature reading means 130 or imaging system 135 to generate and obtain the measurement or image of the feature. The processing means 140 may be further configured to encode the measured feature and to combine it with other information for any desired purpose including, for example, to generate a digital signature. The processing means 140 may include or be configured with software containing algorithms for digitally coding the measurement or image of the feature, and may also be configured to generate virtual identification numbers referencing to the design of the article or tooling or die used to make it, as the case may be, for generating the authentication signature.

In one aspect, the feature may be considered to result in or embody two types of codes, code type p and code type v, which are generated by the processing means 140.

Type p may be a physical code based on the physical structure of the transformed material in the design, and the design itself, which is specific to each coin or other article, if the transformation is made in coin or article, or to the die, mold, punch, or matrix, as the case may be. In the latter case, a family of coins or other articles will have the same code since they come from the same die, etc.

Type v may be a virtual code generated from virtual references linked to the physical designs just created by the transformation and physical reference points of the original design being part of the untransformed material on the coin or other object, if the transformation is made in the object or the coin, or to the die, etc., if the material transformation is made in the original die, etc. In this latter case, a family of coins or other articles will have the same code since they come from the same die, etc. Such references may include, for example, physical features of a design, a form, visible reference points, or locations or details visible only under magnification, or the relative positioning of key features hidden in the created design and which are only known to the manufacturer of the object or the coin.

Both codes, types p and v, may then be combined by the processing means or otherwise used in accordance with a predefined algorithm to produce a digital signature associated with the coin or other article, or die, etc. used to produce it, as the case may be.

Thus, in the example of the maple leaf feature produced as described above, the digital signature may be derived using algorithms encoded in the processing means based on the measured random or probabilistic topographical properties of the feature combined with a detail of the original design of the coin, for example the engraved letters "OZ" in the weight indication 70 shown in FIG. 1. The authentication signature derived from such combination thus incorporates both a type p code, e.g. vectors related to the physical nature of the material transformation, and a type v code which is a virtual code which uses virtual references of the created design and the original design, e.g. identification of the maple leaf and the "OZ" weight indication.

The system 100 may further include a database 150 connected to the processing means 140 for storing the authentication signature.

Figure 3:
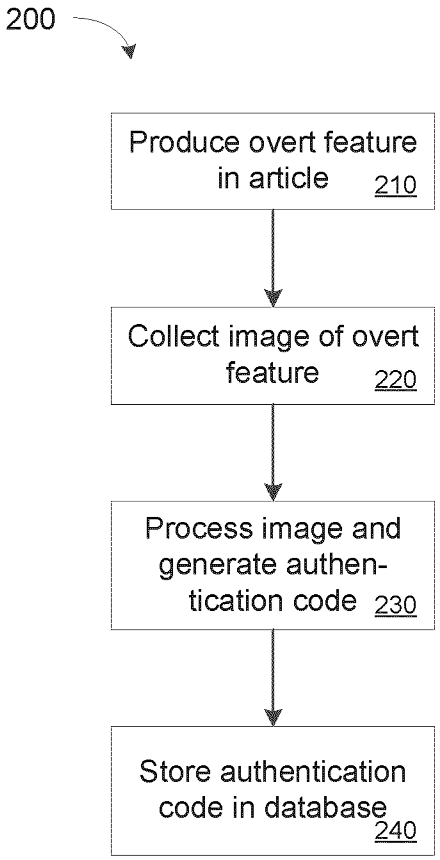
FIG. 3 is a flow chart illustrating a method for producing an authenticatable article.

A method 200 for producing an article which may be authenticated as described herein will now be described with reference to FIG. 3. In the method, the overt feature is made, fabricated, produced, or otherwise provided in the article (step 210). The feature is associated with the product and may identify visually the security feature of the article. For example, where the article is a coin, the feature may be produced by laser engraving the coin surface in a predetermined location with a predefined design. Laser engraving transforms the surface of the coin from a smooth finish to a rough, lumpy finish at the macroscopic scale. This lumpy finish appears as a frosty finish design to the human eye, but under proper magnification the laser-transformed surface has a structure of 3D randomly distributed material which is physically and permanently changed. An observer of the coin seeing the feature may then be aware of the presence of the security feature.

An image of the coin is then collected including in the area containing the overt feature produced in the previous step (step 220). The image may be collected under preselected lighting conditions using any suitable sensors and equipment, e.g. with a camera. The camera is connected or otherwise configured to communicate the image to a server encompassing the processing means. The camera may be provided with any such lenses or other equipment as are necessary or desirable for collecting a suitable image of the overt feature. For example, if a lens of the camera does not provide enough magnification detail, it may be supplemented or replaced with a special lens and special diffused lighting to obtain clarity and illumination without intense glaring and light reflection.

The processing means, having received the collected image from the camera, may be provided with software or otherwise configured to process the image as desired (step 230). For example, the processing means may be configured to decompose the image into vector elements, to classify elements therein, to analyze the elements according to predefined algorithms, and to encode the similarities and the differences to produce a digital code which characterizes the article. Articles having precisely identical physical features would result in the same digital code. Moreover, the digital code may capture all of the common features of the transformed image on the article which may include the 2D/3D surface finish, the form, and the relative physical structure of the material matter.

As discussed above, the code so generated may have two components: the component type p based on the random or probabilistic physical properties of the feature, and the component type v based on a virtual reference which is generated by the software. This virtual reference may be linked to the physical reference. In general, the code may combine information based on the random or probabilistic physical properties of the feature as well as information or identifiers common to the category of coins (e.g. the presence of the letters "OZ") as well as information regarding the category of the security feature (e.g. that it is a maple leaf).

Once the digital authentication code is generated, it may be communicated to and stored in a database (step 240). As indicated above, if the feature is applied to each individual coin or other article, then the authentication code generated therefrom will be unique to that particular coin or article, whereas if the feature is applied to means for producing the article, such as a die or mold used to make a coin, then the feature will be applied to each coin made using that die or mold and thus the authentication code will uniquely identify all of the coins made using that die or mold without distinguishing between them.

Where a number of articles or families of articles are thus produced each having a unique overt security feature and a correspondingly unique authentication signature, the database may contain all such authentication signatures for later use to authenticate any one of the articles or families.

Figure 4:
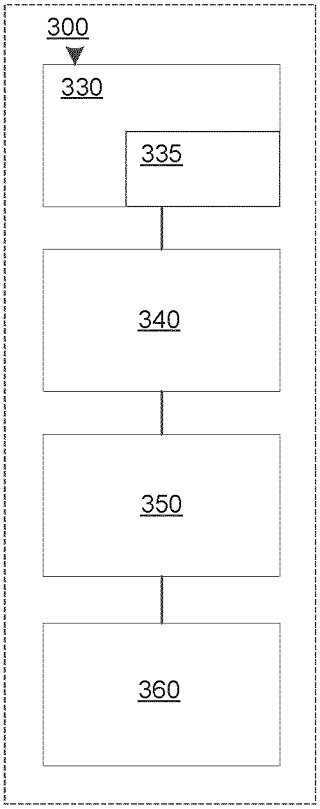
FIG. 4 is a schematic illustration of a system for authenticating an authenticatable article.

Reference is made to FIG. 4 which shows a system 300 for authenticating a high security article as described above. The system 300 includes a feature reading means 330 useful to read or measure the random or probabilistic properties of the overt feature. The feature reading means 330 of the authentication system 300 may be of the same type or a different type from the feature reading means 130 of the article production system 100. The feature reading means 330 may include any components or aspects as are necessary or desirable according to technology employed to produce the feature in order to read, measure, image, or otherwise determine the random or probabilistic properties of the feature, and for example may include any sensors suitable to measure or determine the properties. As in the example developed above, the feature reading means 330 may include or cooperate with a holder which may incorporate a source of controlled illumination, a special lens and a locator which permits the coin or other article to be positioned in a predetermined position, within predetermined tolerances. The feature reading means 330 may include or cooperate with such suitable imaging sensors, such as a camera, which may constitute an imaging system 335.

The system 300 may include processing means 340 connected to or otherwise cooperating with the feature reading means 330 or imaging system 335 to generate and obtain the measurement or image of the feature. The processing means 340 may be further configured to encode the measured feature and to combine it with other information for any desired purpose including, for example, to generate a comparison signature. The processing means 340 may include or be configured with software containing algorithms for digitally coding the measurement or image of the feature, and may also be configured to generate virtual identification numbers referencing the design of the article or tooling or die used to make it, as the case may be, for generating the comparison signature. Finally, processing means 340 may also include or be configured with software algorithms for comparing the comparison signature with the database of previously-generated authentication signatures to determine a match, or otherwise to determine whether the comparison signature indicates that the associated article is authentic within predefined tolerances.

The system 300 may further include a database 350 connected to the processing means 340 for storing the comparison signature. The database 350 may be one and the same as the database 150 containing the authentication signatures as discussed above, or it may be a separate database. Alternatively, the comparison signature may not be stored in a database, but may rather be stored in a transient memory for the purpose of comparing the comparison signature to the authentication signatures stored in database 150, wherein again database 350 is one and the same as database 150. The system 300 may further include a display 360 for displaying a result of a comparison of the comparison signature and any authentication signature, or for displaying results of the authentication process more generally.

In one embodiment, the authentication system 300 includes a portable device equipped with a camera such as a smartphone which may include an accessory comprising an optical system such as is described in U.S. Pat. No. 7,995,140B2 which is included herein by reference. In such case, the feature reading means 330 includes the smartphone or an aspect thereof, and the imaging system 335 may include the camera and imaging features generally of the smartphone. The smartphone may be preconfigured with software operative to perform the functions described herein, including to select from an image of an article collected using the smartphone camera an area of interest on the article to be authenticated, and to send the image to a preconfigured network location such as an Internet website. Alternatively, the smartphone may be configured to send an entire image captured to the network location. Further alternatively, the smartphone may be used to navigate to such location by means and methods known in the art and the image uploaded manually. The processing means 340 in some instances may include an aspect of the processing means of the smartphone. In general, the processing means 340 may include processing means of the remote data processing server to which the image was sent by the smartphone.

Upon receipt of the image at the server, the image may be decomposed, analyzed, coded with preconfigured software algorithms, and a comparison signature may be generated. By comparing the comparison signature generated from the article to be authenticated against the pre-generated and stored signatures in the database a match or lack of match of the coded signatures may be determined within predefined tolerances. Thus, the previously-generated authentication signatures were generated from the same predetermined acquisition area on the article, using the same method of decomposition of the image, the same software algorithms, and the same procedural approach for encoding. The result of the match comparison may be communicated back to the smartphone and displayed on a screen of the smartphone, in which case such screen may constitute an aspect of the display 360 of the system 300. The result may thus be displayed to a user of the smartphone thereby informing them as to whether a positive match has been found, and thus the article at issue is identified as authentic, or whether a match could not be found, and thus the article is identified as inauthentic or suspect, within the time to carry out the communications and processing described above.

Alternatively, the authentication system 300 may include a generally non-portable device such as authentication equipment at point-of-sale or in a bank branch or other facility. In such case, the feature reading means 330 may include an imaging system 335 including a camera, lenses, lighting, and so forth, and may further include a preconfigured holder, sorter, or any other additional aspects to facilitate the authentication process. In some cases, the processing means 340 may be collocated with the feature reading means 330, and the databases 150, 350 may either be remote or also collocated with the feature reading means 330. This would be particularly likely where the authentication system 300 is located in the premises where the article was produced. The display 360 in such case may include a monitor connected with the processing means 340 to display the result of the authentication process. As compared to the embodiment described above wherein the feature reading means 330 includes a smartphone, a non-portable device located at point-of-sale or in a bank branch or other such facility may be provided with an imaging system and cooperating lenses, lighting, etc. so as to obtain a better image of an overt security feature and may thus be rendered more reliable in determining the authenticity of the article.

In further embodiments the feature reading means 330 and imaging system 335 may include a computer and a webcam operatively attached to the computer for capturing an image of the article to be authenticated, wherein the image is communicated via a network to a server for generating the comparison signature and testing it against a database of authentication signatures, as described above, and the display includes a monitor operatively connected to the computer for displaying a result communicated in return from the server.

Figure 5:
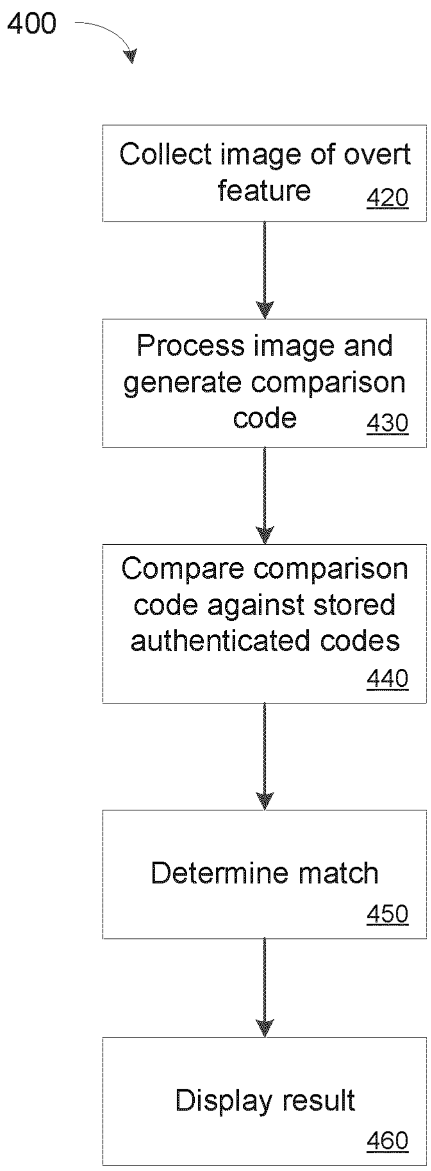
FIG. 5 is a flow chart illustrating a method for authenticating an authenticatable article.

A method 400 for authenticating an article as described herein will now be described with reference to FIG. 5. In the method, an image of the overt feature is collected, or it is otherwise read or measured (step 420). The image may be collected under preselected lighting conditions using any suitable sensors and equipment, e.g. with a camera. The camera may be connected or otherwise configured to communicate the image to a server encompassing the processing means. The camera may be provided with any such lenses or other equipment as are necessary or desirable for collecting a suitable image of the overt feature. For example, if a lens of the camera does not provide enough magnification detail, it may be supplemented or replaced with a special lens and special diffused lighting to obtain clarity and illumination without intense glaring and light reflection.

The processing means, having received the collected image from the camera, may be provided with software or otherwise configured to process the image as desired (step 430). For example, the processing means may be configured to decompose the image into vector elements, to classify elements therein, to analyze the elements according to predefined algorithms, and to encode the similarities and the differences to produce a digital comparison code which characterizes the article.

As in the case with the original authentication codes discussed above, the comparison code so generated may have two components: the component type p based on the random or probabilistic physical properties of the feature, and the component type v based on a virtual reference which is generated by the software. This virtual reference may be linked to the physical reference, and the comparison code may combine information based on the random or probabilistic physical properties of the feature as well as information or identifiers common to the category of coins (e.g. the presence of the letters "OZ") as well as information regarding the category of the security feature (e.g. that it is a maple leaf).

Once the digital comparison code is generated, it may be compared or otherwise tested against the authentication codes already generated and stored in the database (step 440). A determination is then made whether the comparison code matches or otherwise tests positively against any of the authentication codes within predefined tolerances (step 450). The results of this comparison may then be communicated for display to a user (step 460). The result so displayed may include simply an indication that the article is authentic, or alternatively inauthentic or suspect, within the predefined tolerances. Alternatively, the displayed result may include further information including, for example, an indication of the origin of the article where the comparison and authentication signatures commonly correspond to a particular origin, or where the feature has been applied to the means for fabricating the article such as a die for a coin, the display may further indicate the lot number or other identification of the family of articles to which the tested article belongs.

By employing the systems and methods described above, a feature may be produced on a valuable article wherein the feature is visible and recognizable to the unaided eye and may be further recognized as embodying a security feature, but is produced using a fabrication technology which includes a random or probabilistic aspect such that the feature once produced cannot be precisely reproduced.

As noted above, where the feature is applied to means for producing the valuable articles—on the die used to strike coins, for example—then all of the articles made using those means will bear identical replicates of the feature. The signature derived therefrom may then serve to identify and authentication the family of articles, such as all of the coins struck using a die bearing the feature, for example. The fact that the feature bears a determinable and reproducible aspect observable by the unaided eye, but which also contains random or probabilistic features, enables the production of lots or groups of articles which appear to be identical to the unaided eye, but which may be distinguished based on such random or probabilistic features.

For example, a number of dies may be produced each bearing an identical coin design and having an instance of an overt feature having the same identical shape and configuration, applied in each case using the same fabrication technology. The feature on each die will be differentiated, however, by the random or probabilistic properties produced thereon as a result of the fabrication technology. The result will be that all coins struck from all of the dies so produced will appear to the unaided eye to be identical, but each coin may be analyzed to determine from which of the number of dies it was struck as the coins struck by each die will bear the random or probabilistic properties present on that particular die which are different from the properties present on any of the other dies and hence the coins produced using such dies.

In one embodiment, where the feature is applied to the means of making the article—on the die used to strike coins, for example—it may happen that repeated production of articles using the means in significant numbers may result in a degradation or other change of the relevant random or probabilistic properties of the feature. For example, a feature on a die used to strike coins may be degraded over time by mechanical stress. Any coins subsequently struck from the same die would bear the changed feature. Depending on the particulars of the algorithm used to generate the signature, such change may result in a change to the signature so generated. The issue might therefore arise whether an authentication signature originally generated in connection with the feature when first applied and functional to authenticate coins produced at an early stage would continue to identify as authenticate coins produced at a later stage bearing the degraded or changed feature. Left unaddressed, the degradation in the feature on the die might progress to such an extent that coins produced by the die at a later stage would not be identified as authentic with reference to the authentication signature originally generated.

In order to account for an expected degradation or other change in the feature on the die or other means of production, a number of strategies are possible. For example, a single authentication signature useful for authenticating all coins produced by the die over its lifespan may be recalculated from time-to-time based on an average, such as a moving average, of the original authentication signature as well as further authentication signatures calculated from the degraded feature at predefined intervals. Factors which may be taken into account in making the recalculation may include the type of fabrication process involved, the selection and nature of both the overt and covert features of the article, and differences between the system used to generate the authentication signature and the systems to be used to authenticate the articles afterward. Any appropriate number of times or intervals may be selected, and may include a few times during the useful life of a die, for example. Alternatively, a further authentication signature may be determined from time-to-time and added to the database as an additional authentication signature associated with that die. Thus, a single die may have associated with it a number of authentication signatures based on the feature in a number of states or extents of degradation, and thus a single die may have a number of valid signatures. While the features reproduced on coins will be identical to the unaided eye regardless of their extent of degradation in this connection, they may be differentiated based on their extent of degradation by means of the different corresponding authentication signatures derived therefrom. Thus, the authentication signature may be used not only to determine which die was used to produce any particular coin, but at what point in the lifecycle of the die the coin was struck.

The above systems and methods may be particularly useful where the article is a coin made of a dense material such as gold or platinum wherein the material tends to have dense surface morphology and unclear grain boundaries under normal magnification of 20 times. The present methods are operative even at low magnification and thus low cost equipment is sufficient to capture a suitable image.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of producing an authenticatable article, the method comprising:

producing in the article an overt feature using a fabricating technique, the fabricating technique being selected based on a material of the article so as to produce the overt feature having:

predetermined, reproducible macroscopic characteristics; and random, non-reproducible microscopic characteristics, wherein the microscopic characteristics are imageable using a predetermined imaging technology comprising a camera, wherein the material of the article is a dense metal or metal alloy, and wherein the non-reproducible microscopic characteristics are reproducibly imageable using the predetermined imaging technology under 20× magnification;

imaging the overt feature using the predetermined imaging technology to produce an overt feature image;

generating an authentication signature based on the overt feature image; and storing the authentication signature in a central database.

2. The method according to claim 1, wherein the predetermined, reproducible macroscopic characteristics of the overt feature comprise a size or a shape of the overt feature, wherein the shape of the overt feature comprises a code, a symbol, a graphic, or an alpha-numeric character, and wherein the size of the overt feature renders the shape discernible to a naked eye.

3. The method according to claim 1, wherein the predetermined, reproducible macroscopic characteristics of the overt feature comprise a size or a shape of the overt feature, wherein the shape of the overt feature comprises a code, a symbol, a graphic, or an alpha-numeric character, and wherein the size of the overt feature renders the shape discernible only under magnification.

4. The method according to claim 1, wherein the predetermined, reproducible macroscopic characteristics of the overt feature comprise a shape of the overt feature, wherein the shape of the overt feature comprises an identification code associated with production or logistic data for performing tracking, tracing, or quality control of the article, the identification code comprising an access key to a database storing the production or logistic data, or a public key for use with a cryptographic algorithm.

5. The method according to claim 1, wherein the random, non-reproducible microscopic characteristics of the overt feature comprise a predetermined resolution, coarseness, surface roughness, or other property enabling reproducible imaging of the random, non-reproducible microscopic characteristics using the predetermined imaging technology.

6. The method according to claim 1, wherein the article is a coin, and wherein the fabricating technique comprises laser engraving, acid etching, photosensitive etching, random dot machine engraving, or sandblasting.

7. The method according to claim 6, wherein the article is a bullion coin, wherein the material of the article is gold or platinum, and wherein the fabricating technique comprises laser engraving.

8. The method according to claim 1, wherein the fabricating technique is incapable of exactly reproducing the non-reproducible microscopic characteristics, whereby the non-reproducible microscopic characteristics render the article physically unique.

9. A method of producing authenticatable articles, the method comprising:

- producing in an apparatus or means used to manufacture the articles an overt feature using a fabricating technique, the fabricating technique being selected based on a material of the apparatus or means so as to produce the overt feature having:
- predetermined, reproducible macroscopic characteristics; and
- random, non-reproducible microscopic characteristics, wherein the material of the authenticatable articles is a dense metal or metal alloy;
- reproducing the overt feature in the articles when the articles are manufactured using the apparatus or means, wherein the microscopic characteristics are imageable from the articles using a predetermined imaging technology comprising a camera, and wherein the non-reproducible microscopic characteristics are reproducibly imageable using the predetermined imaging technology under 20× magnification;
- imaging the overt feature using the predetermined imaging technology from at least one of the articles to produce an overt feature image;
- generating an authentication signature based on the overt feature image; and
- storing the authentication signature in a central database.

10. The method according to claim 9, wherein the articles are coins, wherein the apparatus or means comprises a die, a punch, or a matrix, and wherein the fabricating technique comprises laser engraving, acid etching, photosensitive etching, random dot machine engraving, or sandblasting.

11. The method according to claim 9, wherein the predetermined, reproducible macroscopic characteristics of the overt feature comprise a size or a shape of the overt feature, wherein the shape of the overt feature comprises a code, a symbol, a graphic, or an alpha-numeric character, and wherein the size of the overt feature is such that the shape is discernible to a naked eye.

12. The method according to claim 9, wherein the predetermined, reproducible macroscopic characteristics of the overt feature comprise a size or a shape of the overt feature, wherein the shape of the overt feature comprises a code, a symbol, a graphic, or an alpha-numeric character, and wherein the size of the overt feature is such that the shape is discernible under magnification.

13. The method according to claim 9, wherein the predetermined, reproducible macroscopic characteristics of the overt feature comprise a shape of the overt feature, wherein the shape of the overt feature comprises an identification code associated with production or logistic data for performing tracking, tracing, or quality control of the articles, the identification code comprises an access key to a database storing the production or logistic data, or a public key for use with a cryptographic algorithm.

14. The method according to claim 9, wherein the random, non-reproducible microscopic characteristics of the overt feature comprise a predetermined resolution, coarseness, surface roughness, or other property enabling reproducible imaging of the random, non-reproducible microscopic characteristics using the predetermined imaging technology.

15. The method according to claim 9, wherein the fabricating technique is incapable of exactly reproducing the non-reproducible microscopic characteristics, whereby the non-reproducible microscopic characteristics render the apparatus or means physically unique.

16. The method according to claim 9, wherein the at least one article is a first one of the articles manufactured using the apparatus or means at a first time during a production process, wherein a second one of the articles is manufactured using the apparatus or means at a second time during the production process, the second time being different from the first time, wherein the overt feature is characterized by a first condition of wear at the first time, and wherein the overt feature is characterized by a second condition of wear at the second time, the second condition of wear being different from the first condition of wear, wherein the microscopic characteristics imageable from the first article are characterized by the first condition of wear, wherein the microscopic characteristics imageable from the second article are characterized by the second condition of wear, wherein the overt feature image produced by imaging the overt feature from the first article is a first overt feature image characterized by the first condition of wear, and wherein the authentication signature is a first authentication signature characterized by the first condition of wear, the method further comprising:

- imaging the overt feature using the predetermined imaging technology from the second article to produce a second overt feature image characterized by the second condition of wear;
- generating a second authentication signature based on the second overt feature image and characterized by the second condition of wear; and
- storing the second authentication signature in the central database.

17. The method according to claim 16, further comprising storing the first authentication signature in the central database in association with the first time, and storing the second authentication signature in the central database in association with the second time.

18. The method according to claim 16 further comprising determining based on the second overt feature image that the second condition of wear exceeds an predefined acceptable level of wear.

* * * * *